United States Patent [19]

Stevenson

[11] 4,256,255
[45] Mar. 17, 1981

[54] METHOD OF BRAZING WITH REPLACED BRAZE POWDER

[75] Inventor: David R. Stevenson, Linwood, Scotland

[73] Assignee: Rolls-Royce Limited, London, England

[21] Appl. No.: 96,849

[22] Filed: Nov. 23, 1979

Related U.S. Application Data

[62] Division of Ser. No. 8,687, Jan. 30, 1979, abandoned.

[30] Foreign Application Priority Data

Feb. 14, 1978 [GB] United Kingdom ................ 5785/78

[51] Int. Cl.³ .............................................. B23K 1/04
[52] U.S. Cl. .................................. 228/175; 228/181; 228/248; 427/183; 427/203
[58] Field of Search ............... 228/181, 248, 256, 262, 228/175; 427/183, 203

[56] References Cited

U.S. PATENT DOCUMENTS

| | | | |
|---|---|---|---|
| 2,262,184 | 11/1941 | Ireton, Jr. ......................... | 427/240 X |
| 2,390,161 | 12/1945 | Marvin ............................. | 427/247 X |
| 3,001,274 | 9/1961 | Price et al. ......................... | 228/181 |
| 3,722,071 | 3/1973 | Orsdel ............................. | 228/181 |

FOREIGN PATENT DOCUMENTS

| | | | |
|---|---|---|---|
| 1334683 | 10/1973 | United Kingdom ................... | 228/194 |
| 582926 | 12/1977 | U.S.S.R. ............................. | 228/248 |

Primary Examiner—Kenneth J. Ramsey
Attorney, Agent, or Firm—Cushman, Darby & Cushman

[57] ABSTRACT

The invention overcomes the difficulty of applying a layer of material e.g. braze material, to a concave surface, by rotating the workpiece having the concave surface, about the axis of revolution of the concavity and the material is applied thereto in powder form and held by centrifugal force. Before stopping rotation, a liquid binder is applied to the material and allowed to set, so as to make the resulting mixture self supporting.

1 Claim, 5 Drawing Figures

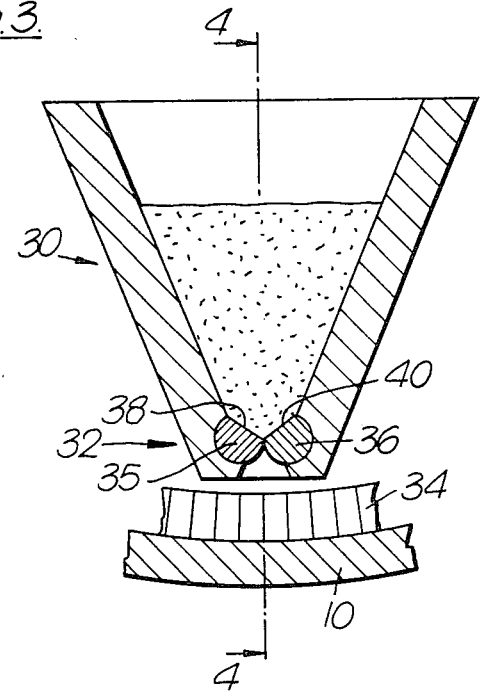
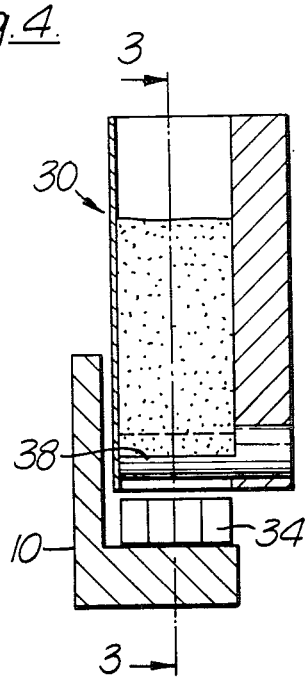
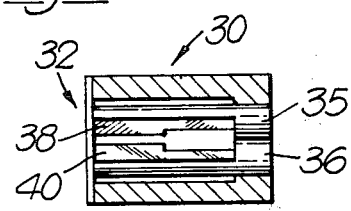

METHOD OF BRAZING WITH REPLACED BRAZE POWDER

This is a division of application Ser. No. 8,687 filed Jan. 30, 1979 now abandoned.

BACKGROUND OF THE INVENTION

The present invention is concerned with the application of a metallic powder to a concave surface on a workpiece.

More particularly, the invention is concerned with applying the metallic powder in a substantially regular manner and retaining it in position during subsequent handling of the workpiece, in preparation for heat treating the workpiece.

The invention has utility in the coating field wherein a metallic powder is required to be deposited on the bore of a shaft or ring e.g. for the purpose of providing a bearing surface. Alternatively, a metallic powder could be deposited in accordance with the invention, on a workpiece bore, so as to provide means whereby a further member can be joined to the workpiece i.e. to provide a layer of braze material on the bore, and thereafter brazing a further member to it.

One known method of applying a metallic powder to a surface in a regular manner which could be adopted irrespective of the shape of the surface, is described in British Pat. No. 1,334,683. The method disclosed therein, requires the application of a layer of tacky adhesive to the workpiece surface, prior to application of the powder. However, this disclosure is limited to the application of a single layer of powder. Should extra layers be required to build up a specific thickness not achievable by mere choice of the magnitude of powder particles, the process must be repeated. Each consecutive layer of powder will need the application of adhesive, prior to having a further powder layer superimposed thereon.

It is an object of the present invention to provide a method of applying a powder material to the wall of a bore in a workpiece and retaining it there, which method enables rapid application in a regular manner, of one or more layers of the powder.

It is a further object of this invention to provide a method of brazing an arcuate honeycomb structure to the wall of a bore in a workpiece, using a metallic braze powder which is applied by the method of the present invention.

A further object of the invention, is to provide apparatus with which powder material is applied to the wall of a bore in a workpiece, by the method of the present invention.

BRIEF DESCRIPTION OF THE INVENTION

According to the present invention there is provided a method of applying a powder material to the wall of a bore in a workpiece including the steps of rotating the workpiece about the axis of the bore and at the same time, applying the powder material to said wall, the powder being held there by centrifugal force and, thereafter continuing rotation of the workpiece and spraying the applied powder with a liquid binder and allowing the binder to dry, whereupon rotation of the workpiece is stopped.

The invention further includes a method of brazing an arcuate honeycomb to the wall of a bore in a workpiece, including the steps of tack welding the honeycomb structure to said wall, rotating the workpiece about the axis of the bore and at the same time applying metallic powder to said wall via the cells of the honeycomb structure, the metallic powder being held there by centrifugal force and thereafter continuing rotation of the workpiece and spraying the applied powder, through said cells, with a liquid binder and allowing the binder to dry, whereupon rotation of the workpiece is stopped, whereafter the resulting assembly is brazed.

The invention provides apparatus for applying a powder to the wall of a bore in a workpiece, said apparatus comprising rotary support means for supporting a bored workpiece, for rotation about the axis of the workpiece bore, means whereby said rotor support means is rotated and a nozzled structure via which in operation, powder is passed to the bore wall, the nozzle of the structure comprising a slot equal in length to the length of the bore wall which it is desired to cover with powder, said nozzled structure being positionable with the nozzle slot length in parallel with the bore axis.

Preferably the nozzled structure comprises a convergent/divergent nozzle, the convergent portion comprising a pair of flat surfaces.

BRIEF DESCRIPTION OF THE DRAWINGS

The invention will now be described by way of example and with reference to the following drawings in which:

FIG. 3 is an enlarged view of FIG. 1 on line 3.3 of FIG. 4,

FIG. 4 is a view on line 4.4 in FIG. 3,

FIG. 5 is a diagrammatic part view of a further embodiment of the invention.

DETAILED DESCRIPTION OF THE DRAWINGS

Figure 1:
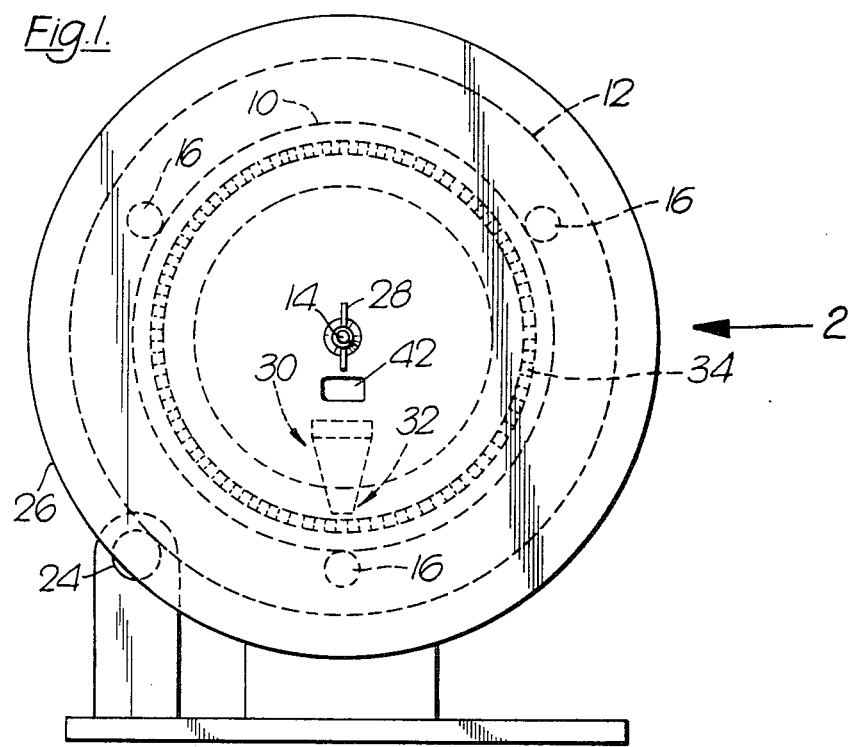
FIG. 1 is a front elevation of apparatus in accordance with the inventions.

Referring to FIG. 1 an annular workpiece 10 is supported for rotation on a magnetic chuck 12. The workpiece is coaxially aligned with the chuck axis 14, by means of three equi-angularly spaced pins 16 inserted in the chuck face.

Figure 2:
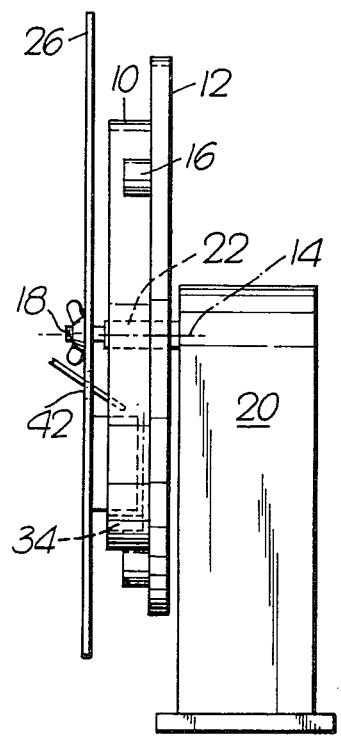
FIG. 2 is a view on arrow 2 of FIG. 1.

Chuck 12 is itself mounted on a spindle 18 (FIG. 2) protruding from fixed structure 20, via a sleeve 22 which is rotatable relative to spindle 18.

Chuck 12 and therefore, workpiece 10, is rotated by a friction drive mechanism 24 (FIG. 1) the power for which is supplied by an air motor (not shown). However, any other suitable drive and power means may be utilised, to achieve the aforementioned rotation.

A transparent, plastic cover 26 is mounted on the non-rotatable spindle 18 and in operation, is held there by a wing nut 28. A nozzle structure 30 is suspended from the inside surface of the cover 26, the nozzle portion 32 thereof being arranged within its outlet vertically below axis 14.

An annular honeycomb structure 34 which is to be brazed to the workpiece 10 is tack welded to the wall of the bore 27 of the workpiece 10. The nozzle 32, is arranged closely adjacent the inner open ends of the honeycomb cells, for the purpose of delivering a metallic braze powder to the wall of the workpiece bore via the honeycomb cells. This operation will be described later in this specification.

Referring now to FIG. 3, nozzle structure 30 comprises a generally 'V' shaped chute which has a rectangular cross section. The nozzle 32 is formed by a closely spaced pair of round rods, 35, 36 each of which has a respective flat 38, 40 formed therein, so as to form a further 'V' shape which is more squat in form, than that of the chute generally. The rods are arranged so that the outlet slot which their spacing forms, has its length contained by the plane which contains axis 14. The length of the rods which is exposed to the flow of metallic powder is made identical with the width of the honeycomb structure over which, it is desired to effect a brazed joint. This feature is illustrated in FIG. 4.

In operation, after assembly of the workpiece and cover onto the chuck as described hereinbefore, the chuck and its associated workpiece are rotated. In the present example rotation is at a rate of one hundred and twenty revolutions per minute. During rotation the inner open ends of the honeycomb structure 34 pass beneath the outlet of nozzle 32.

Braze powder, the quantity of which has been previously decided by the surface area to be covered and the braze thickness to be achieved, is then poured into nozzle structure 30 from an external source, via an aperture 42 (FIG. 2) in cover 26 immediately above the nozzle structure.

Braze powder leaves the structure under gravity and at a volumetric rate determined by the slot proportions. It falls in the form of a curtain, into the honeycomb cells and passes to the wall of the workpiece bore, where it is held by centrifugal force. After passage of all the powder onto the bore wall, rotation of the workpiece is continued and the nozzle of an aerosol spray unit (not shown) is introduced into a further aperture (not shown) in cover 26. The further aperture can be at any convenient place on the cover.

The aerosol unit contains a fluid binder which is sprayed through the honeycomb cells, onto the braze powder. The binder percolates through the powder to the bore wall and, on being allowed to dry, binds the powder particles to each other and to the bore wall. Rotation continues while the binder dries.

If air drying at room temperature is practised, the binder may take several minutes to dry sufficiently to make the powder layer self-supporting, after cessation of workpiece rotation. However, if hot air drying is practised, the drying time is considerably shortened.

The binder should be of the sort which will volatise away during any subsequent heat treatment of the workpiece and braze powder to achieve brazing, so as not to contaminate the brazed joint.

The manner of applying metallic braze powder to a wall of a bore in a workpiece, as detailed herein, is equally applicable, where a bore needs to be re-surfaced as a step towards the restoring its size. Further, powder coatings of any kind could be applied in exactly the same way as could powders which are used to provide abradable sealing surfaces, in jet engine turbine casings.

The example described herein required only a thin layer of braze powder applying to the bore wall. Should a relatively thick layer of powder need to be applied, it might prove necessary to provide dummy end walls to the bore of the workpiece, to prevent powder from the extreme edges of the layer, from moving down the sides of the layer, under centrifugal force.

In FIG. 5 a further embodiment of the invention provides a nozzle structure (not shown) but which corresponds to nozzle structure 32. The further nozzle structure has an outlet profile which is stopped. This arrangement will enable application of differing thicknesses of powder because it will deliver powder to the bore wall at differing rates.

I claim:

1. A method of brazing an arcuate honeycomb structure to the wall of a bore in a workpiece, said method comprising the successive steps of:
   (1) tack welding the arcuate honeycomb structure to the workpiece wall;
   (2) rotating the workpiece and honeycomb structure about the axis of the bore while concurrently applying metallic braze powder to the rotating honeycomb structure and, in turn, the wall of the bore, the thus applied metallic braze powder retained in the rotating workpiece by centrifugal force;
   (3) continuing to rotate the workpiece until a predetermined amount of metallic braze powder is applied;
   (4) applying a liquid binder to the thus applied metallic braze powder through the honeycomb structure while continuing to rotate the workpiece;
   (5) continuing rotation of the workpiece and allowing the thus applied liquid binder to dry retaining the applied metallic braze powder;
   (6) discontinuing rotation of the workpiece; and
   (7) brazing the resulting assembly.

* * * * *